(12) United States Patent
Timmons et al.

(10) Patent No.: US 9,689,624 B2
(45) Date of Patent: Jun. 27, 2017

(54) METHOD FOR MITIGATING THERMAL PROPAGATION OF BATTERIES USING HEAT PIPES

(75) Inventors: Adam T. Timmons, Birmingham, MI (US); Benjamin R. Christian, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 679 days.

(21) Appl. No.: 13/299,886

(22) Filed: Nov. 18, 2011

(65) Prior Publication Data
US 2013/0130074 A1 May 23, 2013

(51) Int. Cl.
*F28D 15/02* (2006.01)
*B60L 3/00* (2006.01)
(Continued)

(52) U.S. Cl.
CPC ........ *F28D 15/0283* (2013.01); *B60L 3/0046* (2013.01); *B60L 11/1874* (2013.01); *B60L 11/1875* (2013.01); *B60L 11/1877* (2013.01); *B60L 11/1879* (2013.01); *F28D 15/0233* (2013.01); *F28D 15/06* (2013.01); *H01M 10/613* (2015.04); *H01M 10/625* (2015.04); *H01M 10/647* (2015.04); *H01M 10/6552* (2015.04); *H01M 10/6555* (2015.04); *B60L 2240/545* (2013.01); *F28F 2265/12* (2013.01);
(Continued)

(58) Field of Classification Search
None
See application file for complete search history.

(56) References Cited

U.S. PATENT DOCUMENTS 4,329,407 A * 5/1982 Gross et al. ................. 429/101
6,010,800 A * 1/2000 Stadnick ........... H01M 10/6553
429/120
(Continued)

FOREIGN PATENT DOCUMENTS

CN 1753242 A 3/2006
DE 102009045271 A1 4/2011
DE 102009057163 A1 6/2011

OTHER PUBLICATIONS

CooLam thermal substrates, http://www2.dupont.com/LED_Lighting/en_US/products/coolam/coolam.html, Oct. 7, 2011, 2 pages.

*Primary Examiner* — Patrick Ryan
*Assistant Examiner* — Carmen Lyles-Irving
(74) *Attorney, Agent, or Firm* — Quinn IP Law (57) ABSTRACT

A battery module with one or more battery cells and a heat exchange member placed in thermal communication with the battery cell, and a method of making a heat pipe system from the heat exchange member. The heat exchange member includes a container with a heat transfer fluid disposed therein. In one form, the heat transfer fluid is capable of going through a phase change as a way to absorb at least a portion of heat present in or generated by battery cell. A pressure control device cooperates with the container and heat transfer fluid such that upon attainment of a predetermined thermal event within the battery cell, the pressure control device permits liberation of at least a portion of the heat transfer fluid to an ambient environment, thereby relieving pressure on the container and removing some of the excess heat caused by the thermal event.

20 Claims, 5 Drawing Sheets

(51) Int. Cl.
  *B60L 11/18*     (2006.01)
  *F28D 15/06*     (2006.01)
  *H01M 10/625*    (2014.01)
  *H01M 10/647*    (2014.01)
  *H01M 10/6552*   (2014.01)
  *H01M 10/6555*   (2014.01)
  *H01M 10/613*    (2014.01)
  *H01M 10/6562*   (2014.01)

(52) U.S. Cl.
  CPC ........ *H01M 10/6562* (2015.04); *Y02T 10/705* (2013.01); *Y02T 10/7005* (2013.01); *Y02T 90/16* (2013.01); *Y10T 29/49353* (2015.01)

(56) References Cited

U.S. PATENT DOCUMENTS

| | | | |
|---|---|---|---|
| 6,106,972 A * | 8/2000 | Kokubo | H01M 2/1083 429/120 |
| 8,492,642 B2 | 7/2013 | Kim | |
| 2006/0060236 A1 | 3/2006 | Kim | |
| 2006/0237688 A1* | 10/2006 | Zimmermann | 252/184 |
| 2006/0272830 A1* | 12/2006 | Fima | E03B 1/00 169/16 |
| 2009/0004559 A1* | 1/2009 | Gardner et al. | 429/163 |
| 2010/0092823 A1* | 4/2010 | Yang et al. | 429/26 |
| 2010/0304252 A1* | 12/2010 | Chan et al. | 429/432 |
| 2011/0159394 A1* | 6/2011 | Matsumoto | 429/440 |
| 2011/0206965 A1 | 8/2011 | Han et al. | |

* cited by examiner

METHOD FOR MITIGATING THERMAL PROPAGATION OF BATTERIES USING HEAT PIPES

BACKGROUND OF THE INVENTION

This invention relates generally to passive thermal management of batteries and portions thereof, and more particularly to the use of a heat pipe with a pressure relief device to reduce the risk of thermal propagation of heat generated within the battery during a thermal event.

Lithium-ion and related batteries, collectively known as a rechargeable energy storage system (RESS), are being used in automotive applications as a way to supplement, in the case of hybrid electric vehicles (HEVs), or supplant, in the case of purely electric vehicles (EVs), conventional internal combustion engines (ICEs). The ability to passively store energy from stationary and portable sources, as well as from recaptured kinetic energy provided by the vehicle and its components, makes batteries ideal to serve as part of a propulsion system for cars, trucks, buses, motorcycles and related vehicular platforms. In the present context, a cell is a single electrochemical unit, whereas a battery is made up of one or more cells joined in series, parallel or both, depending on desired output voltage and capacity.

Temperature is one of the most significant factors impacting both the performance and life of a battery. Environment temperatures (such as those encountered during protracted periods of inactivity in cold or hot environments, or due to extended periods of operation and concomitant heat generation on hot days) or abuse conditions (such as the rapid charge/discharge, or internal/external shorts caused by the physical deformation, penetration, or manufacturing defects of the cells) can negatively impact the ability of the battery to operate correctly, and in severe cases can destroy the battery entirely. Side effects of prolonged exposure to high temperature may include premature aging and accelerated power and energy fade, both of which are undesirable.

Excess heat can be provided by an external source or by the internal failure of a battery cell caused by physical, thermal, or operational abuse conditions outside the recommended tolerances, or by manufacturer defects. The temperature at which an exothermic reaction occurs is known as the onset temperature. The heat required to maintain an exothermic reaction is the heat of reaction. Provision of a heat source that exceeds the onset temperature and maintains the heat of reaction is known as a thermal event. Such thermal events, if left uncontrolled, could potentially lead to a more accelerated heat generation condition called thermal runaway, a condition where (once initiated) the cooling mechanism is incapable of returning one or more of the battery components to a safe operating temperature. In the present context, a thermal runaway is a function of the self heating rate of the exothermic reaction and the temperature, and the time of the reaction is a function of the rate of degradation and the mass of active components taking part in the reaction. Of particular concern is the possibility for excess heating of, and related damage to, a battery cell, pack or related member being used as a source of propulsive power. Conventional heat transfer methods such as forced air and liquid cooling, whether as a primary or backup system, may prove to be effective at avoiding such excessive heat exposure during such a thermal event, but do so by significant additions to overall vehicular system weight, cost, complexity or parasitic power requirements.

Heat pipes may be used to perform some heat transfer solutions mentioned above; however, the manufacture of a heat pipe may also fraught with difficulties. In one form, the pipe is first built and then filled with a suitable heat transfer fluid (typically de-ionized water), after which the internal part of the pipe and the material container within is fluidly isolated from the ambient environment. Such an arrangement is potentially subject to failure due to excess internal pressure, contamination, or chemical degradation of the heat transfer fluid if exposed to too much heat during subsequent manufacture (such as welding or otherwise affixing the heat pipe to a cooling fin, plate, heat sink or other structure). One way around this challenge is the pursuit of a post-process fill of the heat transfer fluid into the heat pipe; however, such an approach is prone to contamination of either the heat transfer medium or assembly, either of which could result in the failure of the operation of the heat pipe.

SUMMARY OF THE INVENTION

A battery thermal management system that is based on the use of a heat transfer fluid in a passive heat exchange member has the potential to limit damage to a battery under excessively high temperature conditions, thus acting to increase temperature uniformity, as well as protect against thermal runaway conditions. This helps to prolong the life of heat-sensitive components, such as the charge-carrying battery cells that form the building blocks of battery modules and battery packs. In a particular form, a heat pipe (or a system based on a heat pipe) may include a channel in the form of an enclosed pipe or fin and a heat transfer fluid disposed therein which can absorb and release a large amount of latent heat (in some instances up to fifty times higher than sensible heat) during isothermal (i.e., constant temperature) changes of phase. As will likewise be discussed in more detail below, the term "heat pipe" as used in the present context will be understood to include not just traditional tubular-shaped embodiments, but also those of other shapes, such as generally fin-like members where generally thin, shallow flow channels are disposed between opposing, generally parallel plates. The use of heat pipes can help to reduce or eliminate the need for active cooling components such as a fan, blower or pump in forced-air or forced-liquid cooling systems by moving heat from the source to a location below the heat transfer fluid's condensation temperature. This is beneficial in that the heat pipe system can provide the ability to maintain the cell in a desired temperature range without drawing power from the battery or another energy source. Heat pipes in close contact with battery cells can act as a thermal buffer that in turn may result in reduced power fade, reduced capacity fade, improved battery life and durability, reduced warranty costs, improved vehicle range and prevention of thermal runaway.

According to one aspect of the invention, a battery module is disclosed. The battery module includes one or more battery cells configured to deliver electric current (for example, but not limited to, providing motive power to an automobile) and a heat pipe placed in thermal communication with one or more of the battery cells. The heat pipe includes a container with a heat transfer fluid disposed therein and a pressure control device. The heat transfer fluid absorbs heat at a heat source end of the heat pipe by changing phase from liquid to gas, and then releases the energy when the gas is re-condensed at the heat sink. The pressure control device (also referred to herein as a pressure relief device), container and heat transfer fluid cooperate with one another such that upon attainment of a thermal event within the battery cell or cells, the pressure control device permits fluid communication of the heat transfer fluid now in the gas phase within the container to an ambient environment. In one form, when a thermal event arises, the pressure is sufficient to overcome the pressure control device; this in turn causes release or related activation of the pressure control device, resulting in a void forming in the heat pipe such that the heat transfer fluid disposed inside the pipe can be liberated, such as to the ambient environment, thereby rapidly removing the latent heat present in the heat transfer fluid. In the present context, a thermal event is one where a temperature in excess of a predetermined threshold is present in or around the battery cell or heat pipe. Such excessive temperature typically produce either thermal expansion in exposed materials (in situations where the exposed material is given a chance to expand) or increases in fluid pressure (in situations where the exposed material is not given a chance to expand, such as when contained within a fixed volume). By release of latent heat present in the heat transfer fluid contained within the heat pipe, the battery module can mitigate or eliminate the thermal propagation of heat to adjacent cells or other heat-sensitive components.

In one optional form, the heat pipe defines a generally cylindrical outer structure, while in another, it defines a generally plate-like rectangular structure or fin. Cylindrical heat pipes may be integrated within or connected to a plate used as a cooling fin at the heat source or cell, with a thermal pathway in communication with a heat sink. Rectangular heat pipes, much like heat pipe cooling fins, may be placed in communication with the heat source with a thermal pathway in communication with a heat sink, where a thermal pathway may include, but is not limited to, direct contact of the heat pipe/fin with the heat sink. One common feature of the heat pipe, regardless of its geometric shape, is a generally two-zone construction, where an evaporation zone is situated near the heat source to absorb heat and thereby convey the fluid from a liquid to a gas, and a condensation zone situated near the heat sink where the fluid releases the energy as it re-condenses from its gas phase to a liquid phase. Such two-zone construction facilitates the movement of the heat transfer fluid contained within, where the movement is determined by the difference in fluid temperature within the two zones as a way to convey the fluid from the heat source to the heat sink. In another optional form, heat pipes or fins may use the free air volume of the pack as the heat transfer pathway from the heat pipes to the heat sink, wherein the heat pipe/fin would be in thermal communication with the cells and the pack free air, and the pack free volume air temperature would be controlled by a heat sink located either within or outside the battery pack. In this option, the internal battery pack temperature would be regulated within nominal operating temperature, and the heat pipe function is to either remove heat or input heat for horizontal heat pipe applications depending on thermal gradients. In either form, the heat pipe is substantially closed such that it defines during normal operation an environment that is substantially fluidly isolated from the ambient environment. In another particular form, the heat transfer fluid is configured to withdraw heat from the battery cell or cells through a liquid-to-gas transition. Thus, such a fluid formed as part of a heat pipe may act as a thermal control device for a lithium-ion or related battery cell, or be part of a structural member or related component (such as cooling plate or cooling fin) that can be placed in thermal communication with the battery cell. Internal flowpaths formed in either the cylindrical or plate-like configurations are used to convey the evaporating fluid from a heat source to the heat sink, while the condensing fluid is conveyed from a heat sink to the heat source by means of gravity. Optionally, when using heat pipes designed for horizontal applications, the heat transfer fluid can be conveyed by the temperature difference across the heat pipe and a wicking system or capillary action to convey the heat transfer fluid back to the heat source. The pressure control device is preferably in the form of a rupture disc, pressure relief valve or comparable structure. In another form, the container is made from a metal or other high thermal conductivity structural material. In this way, the heat pipes form a heat exchange member that, when thermally coupled to an external heat sink (for example, either directly or through an adjacent cooling plate or related heat transfer mechanism), provides a relatively efficient path for heat generated by the individual cells of the battery to escape through the external structure of the heat pipe. This is especially valuable in situations where the heat transfer fluid has been liberated from the heat pipe by means of the pressure control device responding to excess heat and internal pressure from a heat source (such as a cell thermal event), as the air gap left within the structure of the heat pipe fin would function as an additional thermal barrier between adjacent cells. In a particular optional form, the heat pipe may be placed in thermal communication with a cooling plate, fin or other heat transfer mechanism. For example, the cooling plate or fin may be of a generally thin rectangular structure with cooling channels disposed over one or both surfaces, while the heat pipes form generally cylindrical members that extend over one or both of the plate or fin surfaces. It will be appreciated by those skilled in the art that thermal pathways from the heat source to the heat sink would be application-specific. Likewise, for applications where active heating of the cells is required, either a horizontally configured heat pipe with a wicking (bidirectional heat pipe) system may be used to transfer heat from a heat source. For applications such as substantially vertical heat pipes where gravity is the only means of conveying the condensed heat transfer fluid back to the heat source (unidirectional heat pipe), a flexible heater film may be used to assist in the pre-heating of the cells in the module. In one form, these flexible heater films may be made from DuPont's CooLam™. It will be appreciated by those skilled in the art that thermal pathways from the heat source (at one end of the pipe) to the heat sink (at the other end) would be application-specific and determined by acceptable heat transfer performance specifications. For applications where active heating of the cells may be required, either a substantially horizontal heat pipe orientation with a wicking (i.e., a bidirectional heat pipe) system may be used to transfer heat from a heat source, such as heat air, liquid, or a phase change material (PCM) with stored latent heat, may be used. Substantially horizontal (or slightly angled) configurations may take advantage of capillary action to convey the heat transfer fluid back and forth.

In a particular form, the battery pack is made up of numerous battery modules each of which is in turn made up of one or more battery cells each of which delivers electric current for motive power for an automobile. In the present context, the term "motive power" describes a battery pack capable of providing more than mere starting power for another power source (such as an internal combustion engine); it includes battery packs capable of providing sustained power sufficient to propel a vehicle in a manner consistent with that for which it was designed. In one form, the current generated by the battery pack may be used to run one or more electric motors that in turn may be used to turn one or more wheels.

In one preferred form, the heat transfer fluid is made to go through phase changes and concomitant heat exchange under temperatures typically encountered in automotive applications. In one form, a heat transfer fluid used in conjunction with the present invention may be configured to experience a phase change in the range from about −10° C. to about 40° C. generally, or a more particular value within that range, depending on the needs of the battery module; it will be appreciated by those skilled in the art that minor variations near these temperatures are also within the scope of the present invention so long as such variations correspond to the thermal environment in which the automobile is operating, and such environment is one that the automobile is designed for and reasonably expected to be encountered during such operation. As such, the phase change temperature can be "tuned" to particular temperature needs by either a change in chemical composition or internal pressure of the heat pipe.

According to another aspect of the invention, an automobile is disclosed. Certain portions of the automobile are conventional, such as a chassis, body with one or more seats, wheels, and related control mechanisms. In addition, the automobile includes a propulsion system for providing motive power. The propulsion system includes one or more battery modules each of which is made up of one or more battery cells where an electrochemical reaction takes place, as well as a heat pipe placed in thermal communication with the battery cell or cells. The heat pipe has a heat transfer fluid contained therein such that upon exposure of the member in general and the heat transfer fluid in particular to a thermal event produced by, or in the vicinity of, the battery cell, the excessive temperature and concomitant pressure imparted to the heat transfer fluid will cause the fluid or gas (depending on phase) to be ejected from the heat pipe.

Optionally, the heat pipe preferably includes a pressure relief device such that upon attainment of the thermal event, the pressure relief device permits fluid communication between the heat transfer fluid contained within the heat pipe and the ambient environment; such fluid communication allows the release or related liberation of the heat transfer fluid. The pressure relief device may take various forms such as discussed above, including a rupture disc fluidly placed within the heat pipe. Under a normal operating condition (i.e., where the temperature in or around the battery cell and the pressure of the heat transfer fluid within the heat pipe is within the design limits of the pipe), the rupture disc forms a fluid barrier between an interior of the heat pipe and the ambient environment. In an excessive operating condition (such as that attendant to the thermal event mentioned above), the rupture disc will either break or be ejected from the container. In another form, the heat pipe may include (or be coupled to) a cooling plate.

According to yet another aspect of the invention, a method of making a heat pipe for use in a battery module is disclosed. The method includes containing a heat transfer fluid within the heat pipe and arranging it to be in thermal communication with one or more battery cells that make up the module. In this way, a temperature increase in or around the module causes the heat transfer fluid to exert a pressure on the heat pipe; in situations where the temperature increase is high enough, the concomitant pressure increase exerted by the heat transfer fluid on the heat pipe exceeds a predetermined threshold such that a pressure relief device is activated, causing the heat pipe to release at least a portion of the heat transfer fluid. By forming a heat pipe using such a pressure relief device (for example, a rupture disc, relief valve, cap or other calibrated member configured to deploy at a predetermined elevated pressure or temperature), there is reduced risk that subsequent manufacturing steps (especially those that may involve heat exposure to and concomitant overpressure within the heat pipe) will damage or otherwise hamper the operability of the assembled heat pipe. Likewise, the early isolation of the internal compartment of the heat pipe helps to avoid contamination associated with leaving the rupture disc (or a set screw used to hold the rupture disc in place during heat pipe manufacture) off.

In one optional form, the heat pipe includes a pressure relief device that can be used to isolate the fluid contained within the heat pipe from an ambient environment at least when a pressure exerted by the fluid on the heat pipe does not exceed the predetermined threshold; such threshold may be tailored to the particular needs of the heat pipe or the fluid contained within. A set screw may be used to maintain the pressure relief device in place at least during a portion of the pipe manufacture, such as during the affixing of the heat pipe to the battery cell, cooling plate, frame or other structural member. Examples of such affixing may include welding, soldering, brazing or other heat-intensive means known to those skilled in the art. As mentioned above, the heat pipe may define a substantially cylindrical or substantially rectangular shape.

In one optional form, the release of the heat transfer fluid occurs by the activation of a pressure relief device. In a more particular form, such pressure relief device may be a rupture disc that achieves the necessary actuation and related liberation of at least some of the heat transfer fluid through breakage or dislodging of the disc. In one preferred form, the heat pipe is a heat pipe along with a pressure relief device to allow selective release of the heat transfer fluid contained in the heat pipe. Thus, the pressure relief device cooperates with the heat pipe to isolate the heat transfer fluid from an ambient environment at least when a pressure exerted by the heat transfer fluid on the heat pipe does not exceed the predetermined pressure threshold. In another option, the heat pipe may further include a cooling plate placed in thermal communication with the heat pipe. In yet another option, the arranging of the heat pipe to be in thermal communication with one or more battery cells includes interspersing the cooling plates and the battery cells in a sandwich-like structure, where adjacent facing surfaces of the cells and plates are placed against one another to maximize common surface area between them.

DETAILED DESCRIPTION

Figure 1:
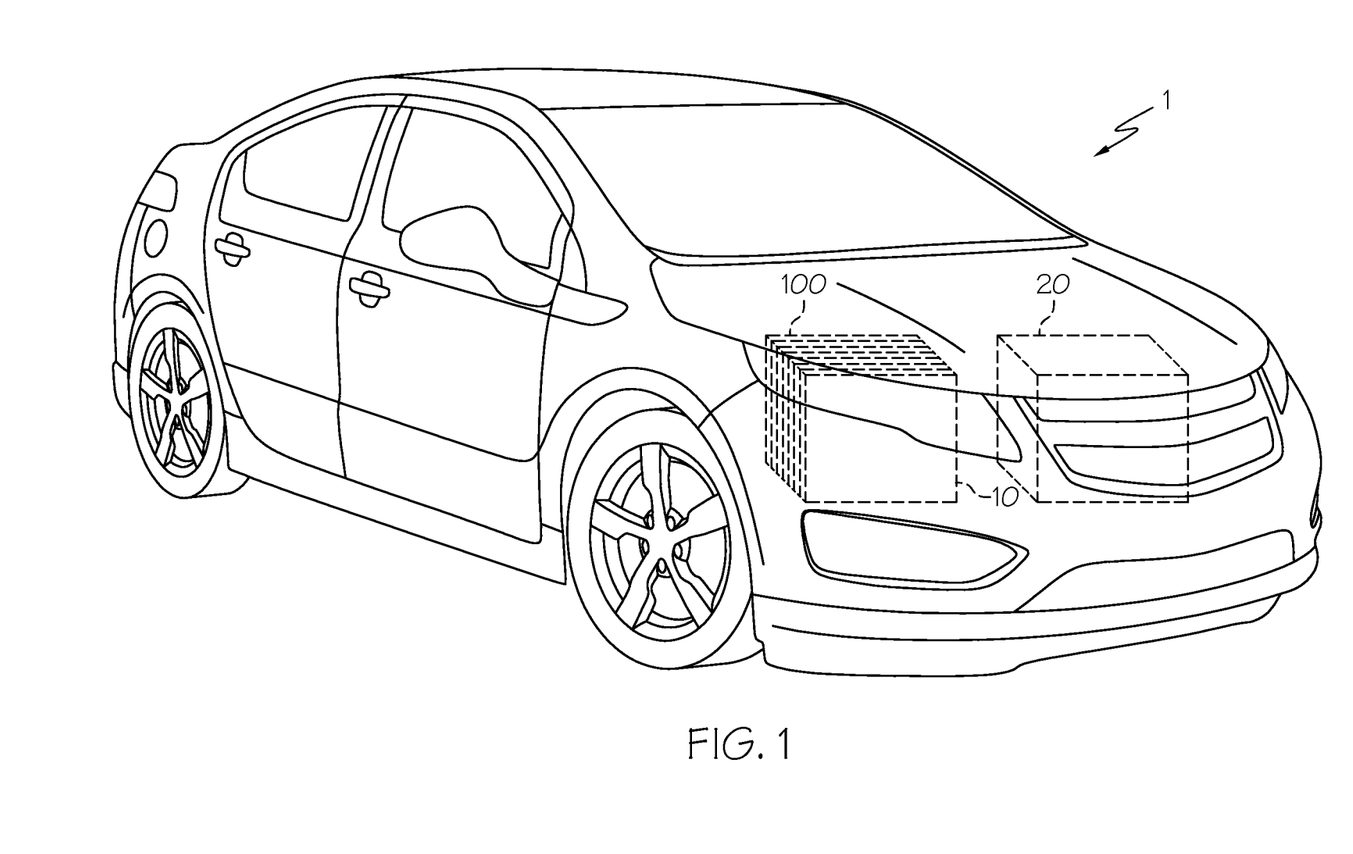
FIG. 1 shows a vehicle with a hybrid propulsion system in the form of a battery pack and an internal combustion engine.

Referring first to FIG. 1, a vehicle 1 includes a hybrid propulsion system in the form of a battery pack 10 and a conventional ICE 20. As mentioned above, such a vehicle is known as an HEV. Battery pack 10 employs numerous battery modules 100 that are typically arranged in a repeating array as shown. In one typical example, battery pack 1 may about two hundred individual battery cells (to be discussed in more detail below), although it will be appreciated by those skilled in the art that additional or fewer cells may be needed, depending on the power required. It will be further appreciated by those skilled in the art that vehicle 1 may not require an ICE 20; in such case, rather than being an HEV, it is a EV; either form is within the scope of the present invention.

Figure 2A:
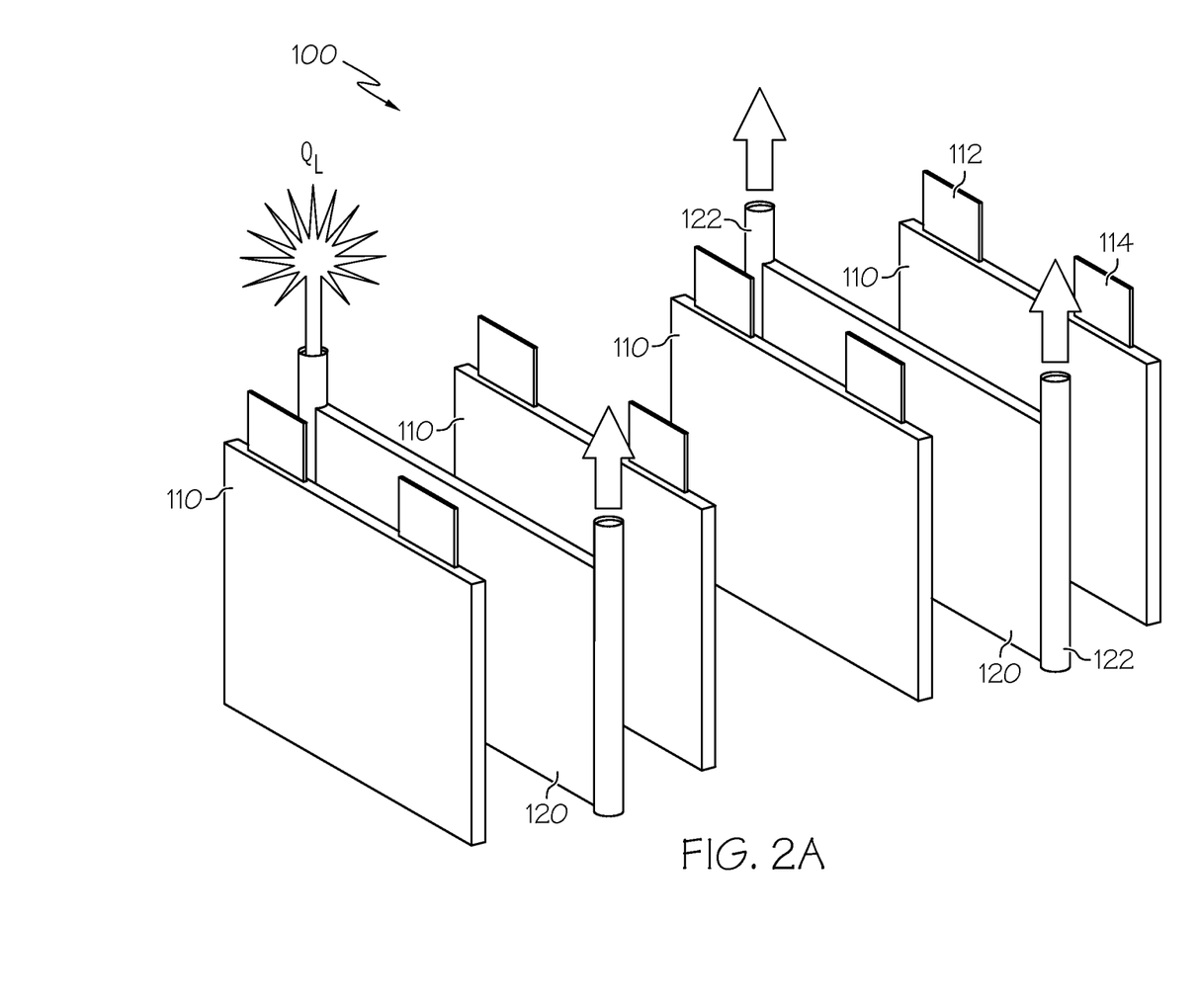
FIG. 2A is a simplified exploded view of a battery module that makes up the battery pack of FIG. 1, where the module includes passive thermal management.

Referring next to FIG. 2A, an exploded view depicting significant portions of a battery module 100 with passive thermal propagation mitigation features is shown, according to one embodiment of the invention. It will be appreciated by those skilled in the art that other battery components necessary for operation are not shown in order to better emphasize such thermal propagation mitigation features. Examples of such presently-omitted components include frames and related structure, cooling plates and fins, and insulative sheets or the like. In order to form the module 100, at least some of the components discussed herein may be arranged in a repeating stack-like manner. For example, numerous battery cells 110 with current-carrying electrodes 112, 114 may be interspersed among numerous cooling plates 120. Additional components, such as heater films (not shown) may also be included. Such films—which in one form may be a flexible sheet—may be used for active heating in low-temperature environments where starting and operating a battery can be particularly harsh on battery life. In one form, these flexible heater films may be made from DuPont's CooLam™. The flexible heater films may, in addition to conveying away excess heat generated by the battery cells 110, be used to convey heat toward the cells 110. Specifically, they can be coupled to an external source (for example, an external electrical current source) to provide active heating for use in cold temperature situations where freezing may be of concern.

As shown, the cooling plates 120 include heat pipes 122. It will be appreciated by those skilled in the art that the present depiction of the heat pipes 122 only at opposing edges of cooling plates 120 is merely exemplary, and that in one particular embodiment, the heat pipes 122 may be placed in a side-by-side manner across a substantial entirety of one or both major surfaces of each of plates 120, The use of an appropriate liquid within the heat pipes 122 promotes additional heat transfer through the selective evaporation and condensation of a small quantity of working fluid contained in an evacuated and sealed container that can take advantage of local variations in internal pressure of the fluid to allow respective absorption or release of latent heat. Acceptable heat transfer fluids for heat pipes include, but are not limited to, de-ionized water in a vacuum which can change from a liquid to gas phase, then re-condensing back to a liquid phase at the heat sink and transferring back to the heat source by use of gravity or a capillary system. The release of latent heat by means of a continuous phase transition cycle is known as a thermal siphon, and the heat transfer fluid can be tuned to the desired operating temperatures by either change in pressure or material composition. Preferably, gravity or capillary action allows fluid condensed at one end of the pipe 122 to move to the opposing end to be evaporated to allow the cycle to be repeated. As will be appreciated by those in the heat pipe art, when the fluid has a large heat of vaporization, a significant amount of heat can be transferred, even when the temperature differences between the opposing ends of the pipe 122 is not great. As stated above, heat transfer fluids may be used as a coolant in the heat pipe 122.

It will be appreciated that other materials besides the presently-disclosed heat transfer fluids may be used to provide at least one of augmented heating or cooling to battery cells 110. For example, microPCM, which is made up of very small bi-component particles or capsules that include a core material that exhibits latent heat changes tailored to a temperature range typically countered in an automobile battery pack, along with an outer shell or capsule made from a polymer or related material such that together, the core and shell define a generally spherical foam-like material. An example of the use of microPCM in a battery thermal management system may be particularly suitable; such is discussed in more detail in co-pending U.S. patent application Ser. No. 13/175,225 entitled LIQUID COOLANT WITH MICROENCAPSULATED PHASE CHANGE MATERIALS FOR AUTOMOTIVE BATTERIES and filed on Jul. 1, 2011, which is owned by the Assignee of the present invention and hereby incorporated in its entirety by reference.

In one preferred embodiment, a pressure control mechanism is situated in or on the heat pipes 122 to allow the fluid (particularly when in gaseous form) to vent; one such scenario where such a release would occur is where the temperature imparted to the heat pipes 122 is high enough to induce an overpressure situation within the pipe's sealed internal cavity. In such event, the released fluid would be introduced into either a free volume contained within the battery pack 10 or released to one or more specific locations, such as a void in the vehicle's engine bay. In another preferred embodiment, the heat pipe 122 housing or vessel is made from a high thermal conductivity material such that the housing acts in a manner generally similar to the aforementioned cooling fins. For example, the housing may be made from a high thermal conductivity metal, such as an aluminum-based or copper-based material.

To achieve a desirable balance between battery life and performance, the present inventors have determined that only small temperature variations between the modules 100 of the pack 10 be permitted. Furthermore, the present inventors have determined that certain types of batteries, such as Li-Ion batteries, operate best at temperatures between 25° C. and 40° C., and that module-to-module differences be kept to no more than about 5° C. The heat pipes 122 can be designed for a specific operating temperature that satisfies the optimum battery cell 110; likewise, the relatively constant temperature of the heat pipes 122 helps improve the likelihood of relatively even cell 110 temperature distribution. One particular use of a heat pipe in conjunction with a lithium-ion battery is disclosed in more detail in co-pending U.S. patent application Ser. No. 12/914,062 entitled COMBINATION OF HEAT PIPE AND LOUVERED FINS FOR AIR-COOLING OF LI-ION BATTERY CELL AND PACK, which was filed on Jul. 1, 2011 and owned by the Assignee of the present invention; the entirety of such application is hereby incorporated by reference. A heat pipe such as heat pipe 122 is an example of a passive heat transfer element. In another example embodiment (not shown), the cooling element in the form of a heat pipe could be a smooth-faced prismatic container where the face of the cooling element is coincident with the face of a prismatic cell. An accordion-shaped structure would respond to pressure changes by having the volume of the cooling element expand through the stretching of the accordion-like folded metal.

Figure 2B:
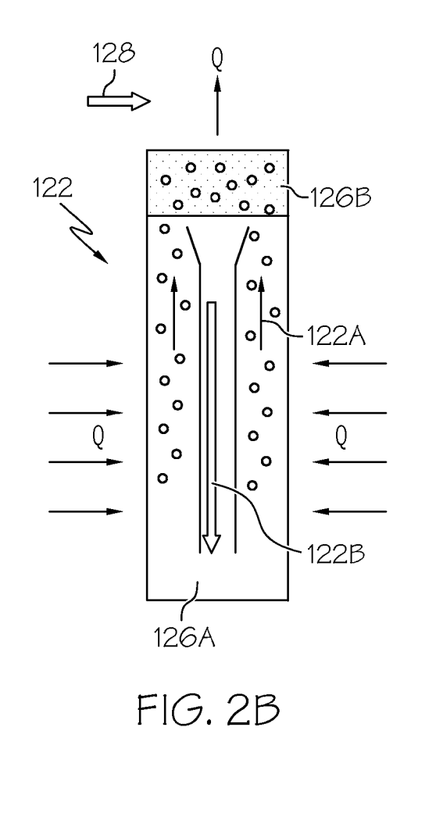
FIG. 2B shows more detail of a heat pipe that can be used as one embodiment to provide passive thermal management to the battery module of FIG. 2A.

Referring next to FIG. 2B, details of the internal construction of heat pipe 122 is shown. Heat transfer fluid 126 contained within the pipe 122 exists in a liquid phase 126A at the evaporation zone that is adjacent a heat source at one end of the pipe 122. In the embodiment shown, where the vertical orientation of pipe 122 promotes a gravity-fed siphoning architecture, heat Q fed to the heat transfer fluid 126 helps it to go through a phase change to a gaseous form 126B that percolates to the top along the outer circumference riser 122A of the heat pipe 122; upon reaching the top of heat pipe 122 that coincides with the condensation zone, the higher-temperature gaseous phase 126B comes into thermal communication with an appropriate heat sink 128, which can be some form of air or liquid cooling. Condensation of the gaseous phase 126B to the denser liquid phase 126A causes the heat transfer fluid 126 to drop through an optional downcomer, wicking device or other means 122B that is disposed radially within the riser 122A, where the fluid 126 can then be used to absorb additional heat Q. As will be appreciated by those skilled in the art, these thermal siphoning attributes of the heat transfer fluid can be tuned for the operating temperature of the individual cells 110 of battery module 100. In one form, such temperature condition may be around 30° C., although other phase change may conditions may also be tailored. As will be discussed in more detail below, a rupture disc is situated within the heat pipe 122 in a region adjacent the evaporation zone where the gaseous phase 126B of heat transfer fluid 126 is present.

Figures 3A, 3B:
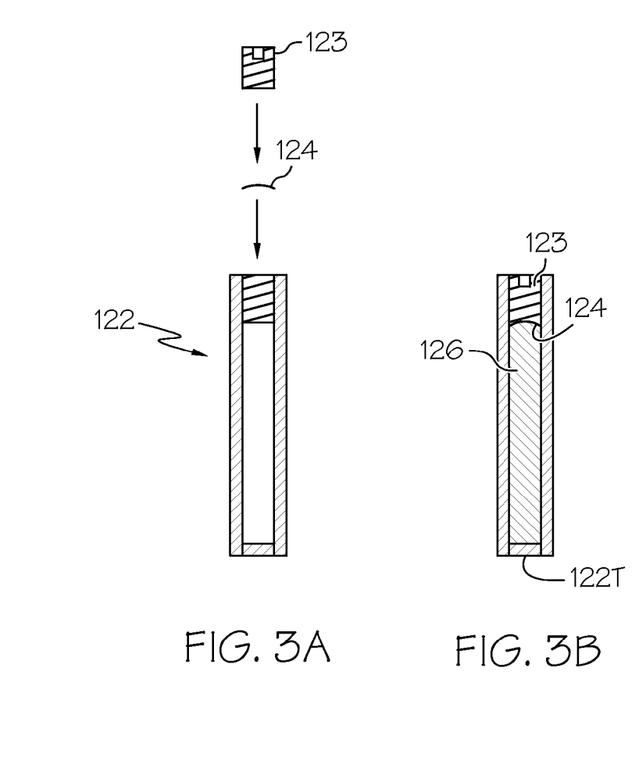
FIGS. 3A through 3C show, in simplified form, assembly of a heat pipe used to provide passive thermal management of one or more battery modules.
Figure 3C:
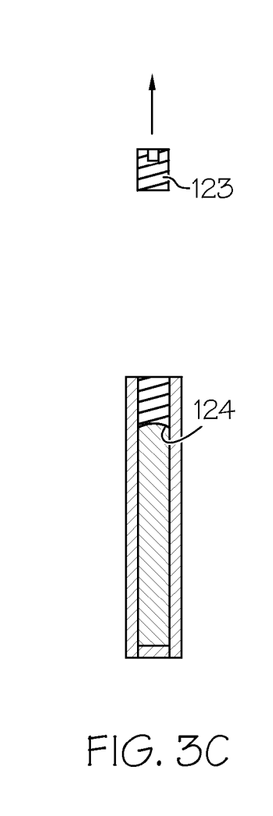

Referring next to FIGS. 3A through 3C, a sequence of steps depicting the manufacture of heat pipe 122 is shown. Referring first to FIG. 3A, a first assembly step is shown, where rupture disc 124 usable as the pressure control device is inserted into an empty heat pipe 122 after which a set screw 123 is threaded into a complementary set of threads at the top of the pipe 122 to secure the rupture disc 124 in place during subsequent heat transfer fluid filling and related sealing. As can be seen in one form, the size of the disc 124 is such that to fit within the slightly smaller diameter dimension of the interior of pipe 122, the disc 124 is slightly flexed to give it a concave form when facing the portion of the interior that will contain the heat transfer fluid. As will be understood by those skilled in the art, the thickness, strength and related rupture properties of disc 124 may be tailored to the particular thermal needs of the battery environment surrounding pipe 122. As such, other forms, including relatively planar (i.e., non-concave) shapes, as well as non-cylindrical shapes, of disc 124 may also be used. Likewise, as mentioned above, appropriate use or combination of other calibrating features, such as scribing, material choice, thickness or the like may be used to impart particular activation response characteristics of disc 124; such variations are deemed to be within the scope of the present invention.

Referring next to FIG. 3B, once the disc 124 and set screw 123 are in place, the heat pipe 122 may be charged by placing a quantity of the heat transfer fluid 126 into the interior portion. In one form, the fluid 126 may be introduced through a temporary hole 122T or through a yet-to-be-secured covering or closure, such as that shown at the bottom of heat pipe 122. During this step, the set screw 123 remains in place to provide additional support to disc 124. Although shown notionally with the charge port introduction being located at temporary hole 122T, it will be appreciated by those skilled in the art that, depending on the type of heat pipe manufacturing, the other end may serve as a charge port for heat transfer fluid 126 introduction, so long as such introduction does not interfere with precisely calibrated nature of the rupture disc 124.

Referring next to FIG. 3C, once the heat transfer fluid 126 and disc 124 are securely in place within pipe 122, the pipe 122 may be sealed (for example, at the point of fluid introduction at hole 122T from the step corresponding to FIG. 3B). In addition, set screw 123 may be removed. Although not shown, another form of safety device that may be used as part of heat pipe 122 is a pressure relief valve. Such a valve could be used instead of rupture disc 124 as a way to allow selective venting of the heat transfer fluid 126 to the ambient environment upon attainment of a predetermined overpressure condition within one or more of the heat pipes 122. The use of such a pressure relief valve is considered to be within the scope of the present invention. It will likewise be appreciated by those skilled in the art that there is no requirement that a screw-based device be used to provide reinforcement of the heat pipe 122 during manufacture or assembly, as other means for temporarily securing disc 124 in place may be used to ensure the structural integrity of the disc 124 during heat pipe 122 assembly. By way of non-limiting example, friction-fit members, as well as ablative or related sacrificial products may be used, so long as they are possessive of sufficient ability to withstand temperature and pressure conditions expected to be encountered during fabrication of the heat pipe 122 or its subsequent attachment to cooling plate 120 or other component within the battery module 100. The present use of the set screw 123 and the rupture disc 124 helps to avoid the overheating or contamination difficulties associated with traditional heat pipe manufacture. As mentioned above, the supplemental support provided by set screw 123 should be sufficient to prevent inadvertent or premature activation of the rupture disc 124 during the manufacturing steps of heat pipe 122, and that subsequent removal of the set screw 123 may be undertaken once most or all of the steps that otherwise could run the risk of exposing the heat pipe 122 to excessive heat or temperature conditions have been completed.

Figure 4A:
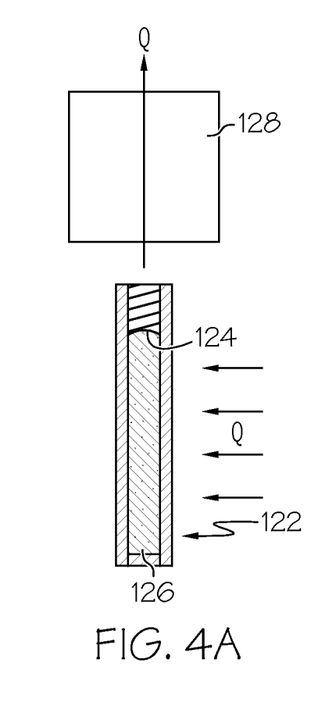
FIGS. 4A through 4C show a mode of operation of the heat pipes of FIGS. 3A through 3C for normal (FIG. 4A) and thermal runaway (FIGS. 4B and 4C) modes of operation.
Figure 4B:
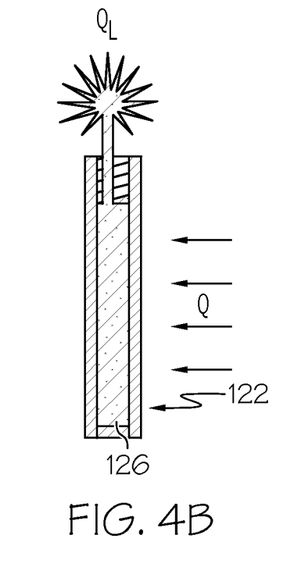
Figure 4C:
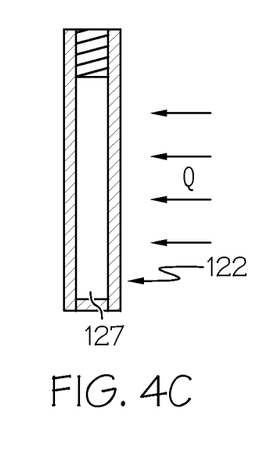

Referring next to FIGS. 4A through 4C, operation of the heat pipe 122 manufactured in accordance with the steps depicted in FIGS. 3A through 3C is shown for both normal thermal conditions (FIG. 4A) as well as conditions of thermal runaway (FIGS. 4B and 4C). Referring with particularity to FIG. 4A, under normal operating conditions, the heat pipe 122 as well as the heat transfer fluid 126 contained therein will absorb heat from the battery or related ambient environment. During such normal operation, rupture disc 124 remains in place, while excess heat Q is released from the condensing end of heat pipe 122 to be routed to a heat sink 128. During such time, the heat pipe 122 is able to withdraw heat from the cell at the fluid's liquid-gas transition temperature.

Referring with particularity to FIGS. 4B and 4C, during thermal runaway or a related abuse condition where the heat flow Q exceeds the capability of the container 122 to hold the heat transfer fluid 126, the internal pressure inside the heat pipe 122 caused by the heat transfer fluid 126 exceeds the limit of rupture disc 124, causing it to rupture or otherwise become dislodged. This in turn creates a flowpath between the high pressure environment inside the heat pipe 122 and the ambient environment. The highly pressurized fluid 126 escapes through the newly-created flowpath; its latent heat is then liberated, to be absorbed by the ambient environment. In one form, the ambient environment may be a free volume within the battery pack 10, while in others it may be ambient air, and while in another still it can be routed (such as through appropriate piping or related conduit, not shown) to a specific fluid-receiving location. Once the fluid 126 has escaped from the heat pipe 122, the interior of the pipe 122 may become backfilled with gas (such as air) from the ambient environment. The relatively low thermal conductivity of the residual gas 127 (for example, air) helps the heat pipe 122 (as well as the cooling plate 120) act as a thermal barrier; in this way, temperature-sensitive components, such as adjacent ones of battery cells 110, can be additionally insulated from exposure to excess heat generated by a neighboring battery cell 110, thereby reducing the likelihood of thermal runaway. Importantly, the relatively low cost construction of the sacrificial rupture disc 124 permits relative ease of replacement once one or more heat pipes 122 have been exposed to thermal runaway conditions. Supplemental devices, such as sensors (not shown) may be used to monitor heat pipe 122 health such that upon attainment of a certain predetermined threshold, a signal may be sent (for example, to a computer or related controller, as well as to a vehicle operator) to identify one or more ruptures or related thermal events.

Figure 5A:
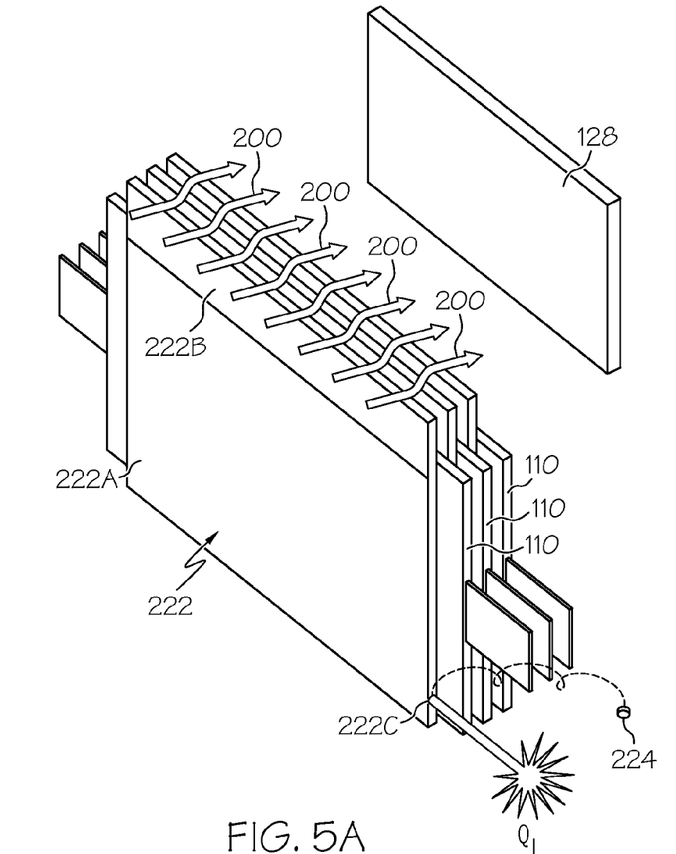
FIG. 5A shows an alternate embodiment of heat pipes used as a passive thermal management between cells of a battery module.
Figure 5B:
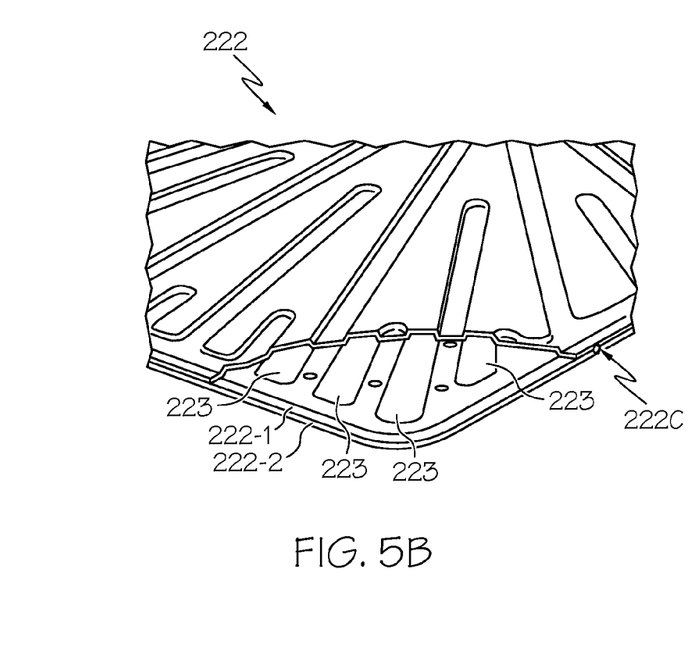
FIG. 5B shows details of the alternate embodiment heat pipes of FIG. 5A.

Referring next to FIGS. 5A and 5B, an alternate embodiment heat pipe 222 is shown. The discussion above related to the manufacture and operation of the generally cylindrical heat pipes 122 is equally applicable to the embodiments of FIGS. 5A and 5B, where heat pipe 222, rather than being of a generally cylindrical tubular structure such as that depicted in FIGS. 2 through 4C, is of generally plate-like construction, where movement of the heat transfer fluid is dictated by channels 223 formed between opposing major generally planar surfaces 222-1 and 222-2. Air flow 200 may provide convective cooling past the edges of the various rectangular heat pipes 222 (as well as the individual fuel cells 110) on its way to a heat sink 128. As shown, pressure relief in the form of rupture disc 224 could be located anywhere along the edge of heat pipe 222 to remove the latent heat. As with the rupture disc 124 discussed above, it will appreciated by those skilled in the art, that rupture disc 224 or a related plug, cap, cover or other heat pipe enclosure mechanism may be scribed or otherwise calibrated with particular tear properties to give it a substantially predetermined temperature or concomitant pressure attributes upon which activation occurs. Similarly, the aforementioned pressure relief valve (not shown) may be employed such that upon activation at a suitable temperature or pressure level, it allows for fluid communication between the inside of the pipe 222 and the ambient environment. Any of these variants are deemed to be within the scope of the present invention. In the present configuration, the heat pipe 222 may do away with the need for separate cooling plates 120 (such as those shown in FIG. 2A). Despite having a thin, generally planar profile, the rectangular heat pipe 222 includes channels 223 formed between surfaces 222-1 and 222-2 to allow the placement of the heat transfer fluid therein. Such fluid may also be made to circulate through adjacent cooling plates 120 such that heat absorbed into the fluid can be withdrawn downstream by a suitable heat exchanger (not shown). In the event that cooling plates 120 are retained for cooperation with the planar profile of heat pipe 222, the cooling plates 120 present a relatively large area as a contact surface to augment heat transfer to or from the battery cells 110. Likewise, cooling fins (not shown) may also be employed to provide additional cooling surface area. In one form, one or more thermistors (not shown) or related sensors may be situated between the various components to monitor battery cell 110 temperature. In one form, channels 223 are generally elongate such that the heat transfer fluid disposed within can be heated and evaporated at one of the opposing ends or zones 222A and 222B of heat pipe 222, while being cooled and condensed at the other respective end or zone in a manner similar to the cylindrical counterpart discussed above. One way to augment the heat transfer ability of the rectangular heat pipes 222 is to have the surfaces 222-1 and 222-2 be made from very high thermal conductivity (such as aluminum-based or copper-based) materials, as well as have significant through-the-thickness contact. As with the flowpath (not labeled) that is created in the heat pipe 122 of FIG. 4B upon the dislodging of the rupture disc 124 and the set screw 123, the high pressure environment inside heat pipe 223 causes the heat transfer fluid to dislodge the rupture disc 224 to open up a flowpath 222C between the inside of the heat pipe 222 and the ambient environment.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, terms such as "substantially" are utilized to represent the inherent degree of uncertainty that may be attributed to any quantitative comparison, value, measurement, or other representation. It is also utilized to represent the degree by which a quantitative representation may vary from a stated reference without resulting in a change in the basic function of the subject matter at issue.

For the purposes of describing and defining the present invention it is noted that the term "device" is utilized herein to represent a combination of components and individual components, regardless of whether the components are combined with other components. For example, a device according to the present invention may comprise a source of motive power, a vehicle incorporating the source of motive power or other equipment that may make up, or be used in conjunction with, the vehicle or source of motive power. Furthermore, variations on the terms "automobile", "automotive", "vehicular" or the like are meant to be construed generically unless the context dictates otherwise. As such, reference to an automobile will be understood to cover cars, trucks, buses, motorcycles and other similar modes of transportation unless more particularly recited in context. Likewise, the invention may be used in conjunction with battery cells unrelated to automotive applications, where temperature-sensitive equipment may need added thermal protection; such additional configurations are understood as being within the scope of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of passively inhibiting propagation of a thermal event through a battery module, the method comprising:
   obtaining the battery module, the battery module including:
      a first cell configured to deliver a portion of an electric current;
      a second cell configured to deliver another portion of the electric current;
      a heat pipe disposed between the first cell and the second cell,
      the heat pipe having a first portion and a second portion, the first portion being disposed between the first cell and the second cell, the second portion being disposed in a protrusion extending from between the first cell and the second cell,
      the heat pipe defining a cavity, the cavity including an evaporation zone and a condensation zone, the evaporation zone corresponding to the first portion and the condensation zone corresponding to the second portion,
      the heat pipe being in thermal communication with the first cell and the second cell;
      a heat-transfer fluid disposed within the cavity, the heat-transfer fluid configured to undergo a phase change due to absorption of heat produced by at least one of the first cell and the second cell, the phase change increasing a pressure within the heat pipe; and
      a pressure-relief device coupled to the heat pipe, the pressure-relief device being actuated after the pressure within the heat pipe exceeds a predetermined level;
   moving, after occurrence of the thermal event in the first cell and via actuation of the pressure-relief device, latent heat from proximate the first cell to an external environment by removing at least a portion of the heat-transfer fluid from the cavity to produce a vented heat pipe; and
   inhibiting heat transfer between the first cell and the second cell using the vented heat pipe.

2. The method of claim 1, further comprising:
   evaporating the heat-transfer fluid at the evaporation zone to produce a vapor;
   transferring the vapor to the condensation zone;
   condensing the heat-transfer fluid at the condensation zone to produce a liquid; and
   returning the liquid to the evaporation zone using gravity.

3. The method of claim 1, wherein the first portion of the heat pipe has a cross-sectional outer profile that generally defines a rectangle.

4. The method of claim 1, wherein the first portion of the heat pipe is formed from a material having a high thermal conductivity.

5. The method of claim 1, further comprising cooling the second portion of the heat pipe using a cooling plate in thermal communication therewith.

6. The method of claim 1, wherein the pressure-relief device is a rupture disc.

7. The method of claim 1, wherein the pressure-relief device is a relief valve.

8. The method of claim 1, wherein the external environment is a free volume within the battery module.

9. The method of claim 8, wherein a first thermal conductivity of gasses in the free volume is lower than a second thermal conductivity of the heat-transfer fluid such that backfilling of the vented heat pipe increases insulating properties of the heat pipe.

10. A battery module comprising:
    a first cell configured to deliver a portion of an electric current;
    a second cell configured to deliver another portion of the electric current;
    a heat pipe disposed between the first cell and the second cell,
       the heat pipe having a first portion and a second portion, the first portion being disposed between the first cell and the second cell, the second portion being disposed in a protrusion extending from between the first cell and the second cell,
       the heat pipe defining a cavity, the cavity including an evaporation zone and a condensation zone, the evaporation zone corresponding to the first portion and the condensation zone corresponding to the second portion, and
       the heat pipe being in thermal communication with the first cell and the second cell;
    a heat-transfer fluid disposed within the cavity, the heat-transfer fluid configured to undergo a phase change due to absorption of heat produced by at least one of the first cell and the second cell, the phase change increasing a pressure within the heat pipe; and
    a pressure-relief device coupled to the heat pipe, the pressure-relief device being actuated after the pressure within the heat pipe exceeds a predetermined level,
    wherein the battery module is configured to passively move latent heat from proximate the first cell to an external environment after a thermal event by removing at least a portion of the heat-transfer fluid from the cavity to produce a vented heat pipe, and wherein the vented heat pipe is configured to inhibit propagation of the thermal event to the second cell by inhibiting heat transfer therebetween.

11. The battery module of claim 10, wherein movement of the heat-transfer fluid within the heat pipe includes moving the heat-transfer fluid as a liquid to the evaporation zone using gravity.

12. The battery module of claim 10, wherein the first portion of the heat pipe has a cross-sectional outer profile that generally defines a rectangle.

13. The battery module of claim 10, wherein the first portion of the heat pipe is formed from a material having a high thermal conductivity.

14. The battery module of claim 10, further comprising a cooling plate placed in thermal communication with the second portion of the heat pipe, the cooling plate being configured to cool the second portion of the heat pipe.

15. The battery module of claim 10, wherein the pressure-relief device is a rupture disc.

16. The battery module of claim 10, wherein the pressure-relief device is a relief valve.

17. The battery module of claim 10, wherein the portion of the heat-transfer fluid removed from the heat pipe is transferred to a free volume within the battery module.

18. A method of manufacturing a battery module including a heat pipe, the method comprising:
    obtaining the heat pipe including a housing including a plurality of threads, the housing defining a cavity having an open end;
    coupling a pressure-relief device to the open end of the cavity, the pressure-relief device generally sealing a volume within the cavity, the pressure-relief device configured to be actuated after a pressure within the cavity exceeds a first predetermined level;

releasably securing the pressure-relief device with a removable fastener, the removable fastener being configured to inhibit actuation of the pressure-relief device after the pressure within the cavity exceeds the predetermined level;

filling a portion of the volume with a heat-transfer fluid;

affixing the heat pipe between a first battery cell and a second battery cell; and removing, after filling the portion of the volume with the heat-transfer fluid and after affixing the heat pipe, the removable fastener such that the pressure-relief device is actuated after the pressure within the cavity exceeds the predetermined level.

19. The method of claim 18, wherein the pressure-relief device is a rupture disc and the removable fastener is a set screw configured to engage the heat pipe, and wherein coupling the pressure-relief device to the open end of the cavity includes:

placing the rupture disc proximate the open end of the cavity;

abutting the rupture disc with the set screw;

engaging the set screw with the plurality of threads of the housing; and rotating the set screw to engage the rupture disc with the heat pipe.

20. The method of claim 18, wherein filling a portion of the volume with the heat-transfer fluid occurs before affixing the heat pipe.

* * * * *